Patented Aug. 12, 1941

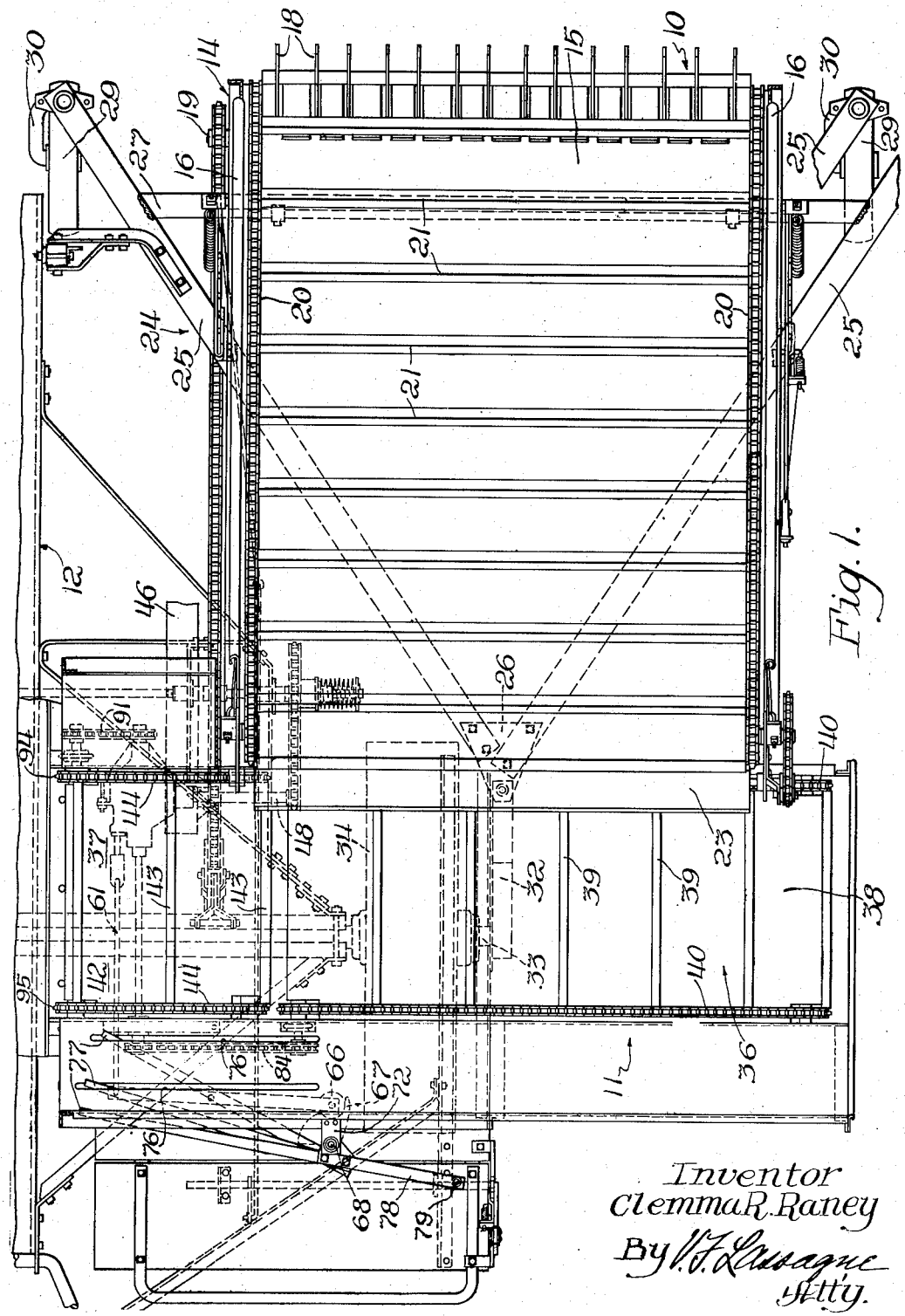

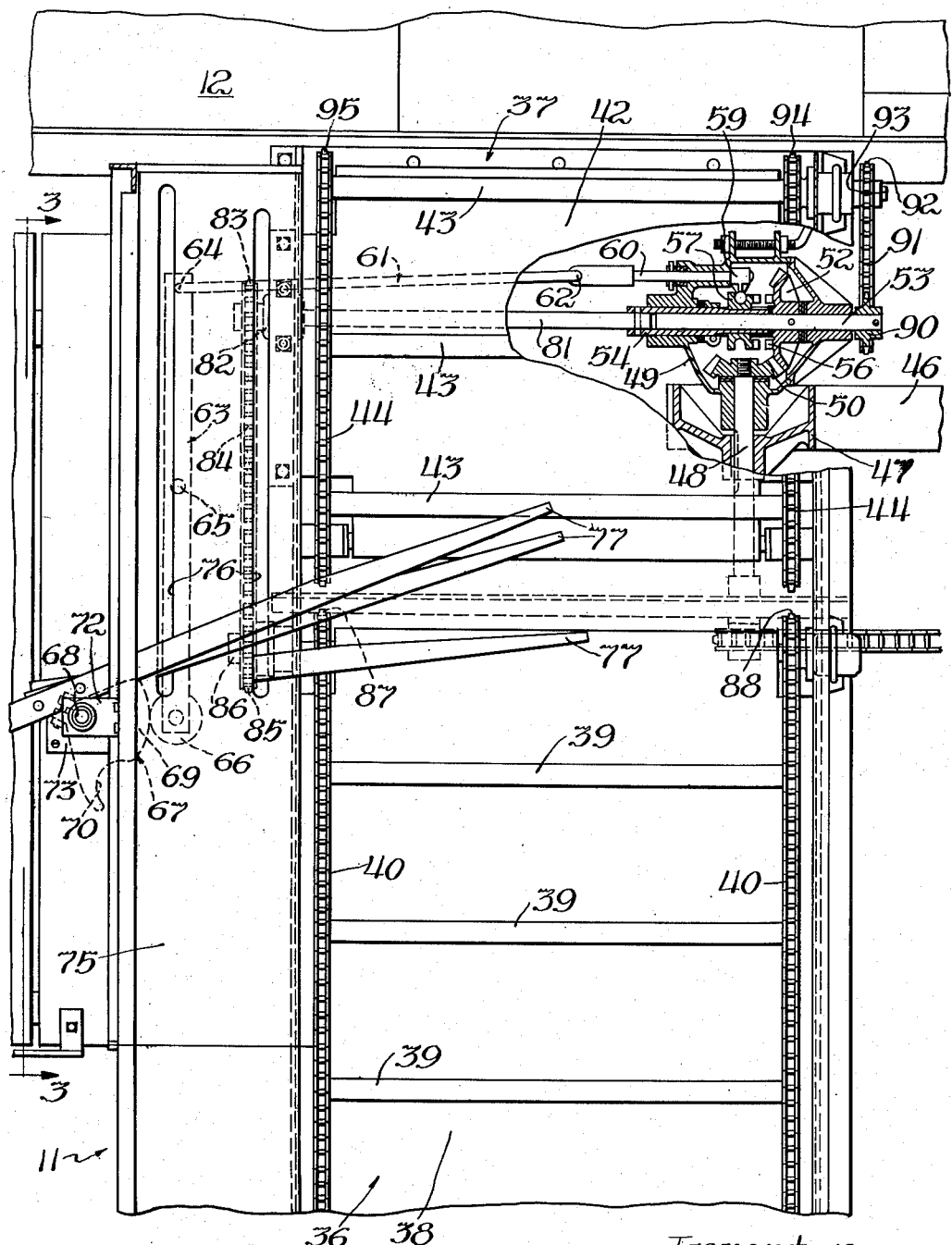

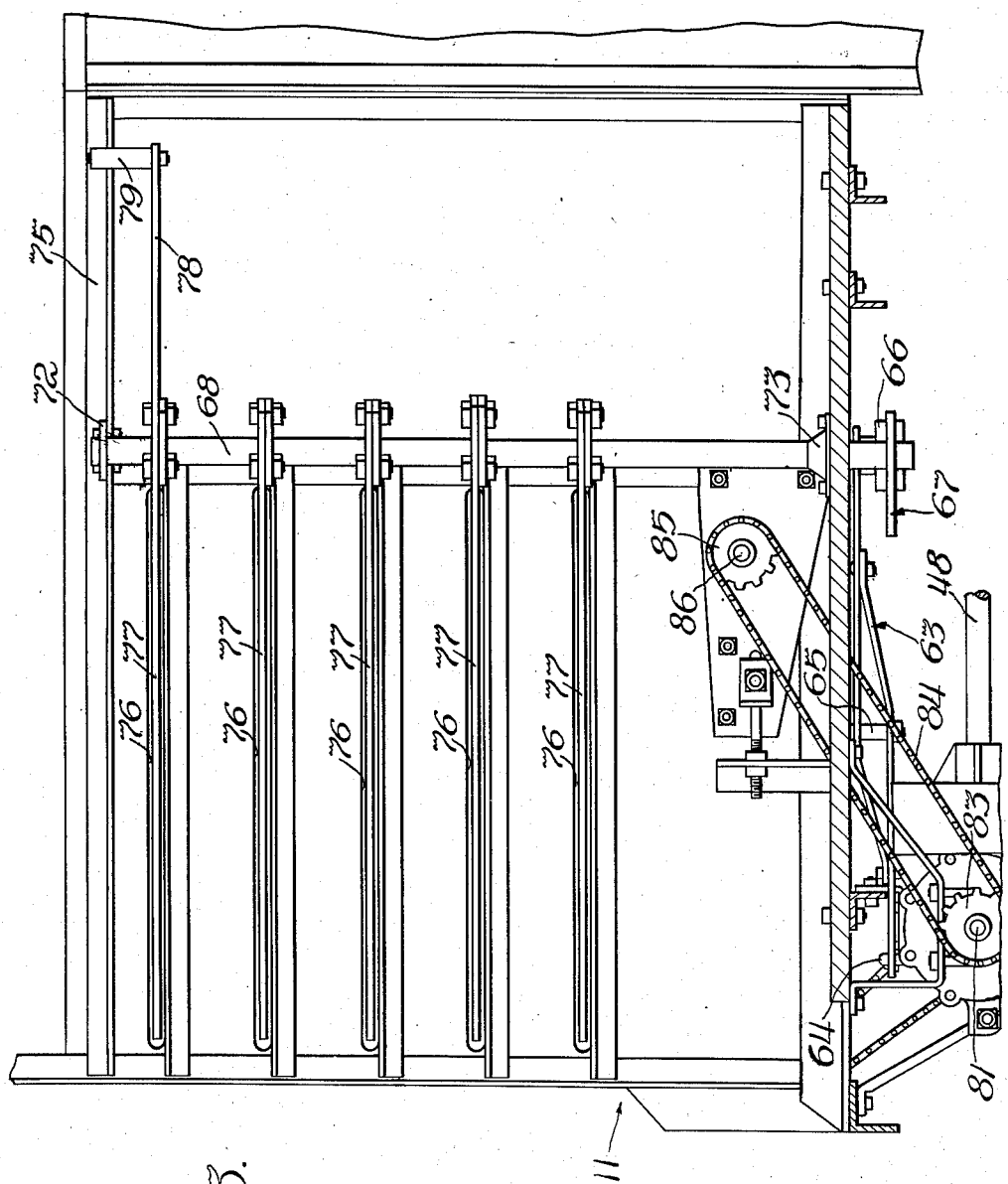

2,252,354

UNITED STATES PATENT OFFICE 2,252,354

PICKUP BALER

Clemma R. Raney, Riverside, Ill., assignor to International Harvester Company, a corporation of New Jersey Application October 8, 1938, Serial No. 233,998

11 Claims. (Cl. 100—25)

This invention relates to a pick-up baler. More specifically it relates to a novel conveying mechanism between the pick-up unit and the baler unit.

Pick-up balers normally consist of a pick-up unit, a baling unit, and conveying means between the two units for moving material to be conveyed from the pick-up unit to the baler unit. The material to be conveyed, for example, hay, is fed continuously into the baler unit and compressed by it there into bales. At intervals the setting of a block is necessary for the proper division of the hay compressed into bales. For this there must be a temporary stopping of the flow of hay into the baler, as well as a separation of the hay in the baler and the hay coming into the baler, in order that the block may be put into position. The invention is directed to a conveying mechanism which will allow the stopping of the flow of hay and separation thereof for the setting of the block.

An object of the invention is to provide an improved pick-up baler construction.

Another object is the provision of a novel conveying mechanism for use between a pick-up unit and a baler unit.

A further object is to provide an improved conveyer mechanism upon which the flow of hay may be stopped and divided for the setting of a block in the baler unit.

The novel conveying mechanism comprising the present invention is composed of a pair of conveyers, one a short conveyer adjacent a baling unit, and the other a long conveyer adjacent the pick-up unit. Hay is fed by the pick-up unit to the long conveyer, by the long conveyer to the short conveyer, and by the short conveyer to the baling unit. When a block is to be set in the baler unit, the long conveyer is stopped and fingers move out to prevent the flow of hay from the long conveyer to the short conveyer. The short conveyer is kept running. The result is a stopping of the flow of hay and a clear division between the hay in the baler and the hay in the conveyer, since the retaining fingers and the stopping of the long conveyer prevent flow of hay to the short conveyer, and the short conveyer quickly clears itself of hay previously conveyed to it.

In the drawings,

Figure 1 is a plan view of the novel pick-up baler, showing the pick-up unit and conveyer mechanism;

Figure 2 is an enlarged plan view of the novel conveying mechanism and shows the driving elements of the conveying mechanism in detail; and, Figure 3 shows a section taken along the line 3—3 of Figure 2.

The pick-up baler comprises a pick-up unit 10, conveying mechanism 11, and baling unit 12. Details of the latter are not shown, inasmuch as they form no part of the present invention. The pick-up unit 10 includes a body 14 having a floor 15 and sides 16. At the lower edge of the pick-up unit there are tines 18 mounted upon a drum, not shown, driven by a shaft 19, for gathering hay from the ground and moving it into the body of the pick-up unit. There are chains 20 at each side of the body for driving the shaft 19, and between them are secured a plurality of spaced slats 21. At the top of the body 14 and slightly below it is a roll 23. The pick-up unit is supported by an A-frame 24 composed of legs 25 joined by a triangular plate 26 and a cross piece 27 extending between the legs. The ends of the legs 25 are supported on wheels 29 and axles 30. The triangular plate 26 is secured to means 32 supported on the end of an axle 33. One end of this axle is supported by a wheel 34. The support for the other end is not shown.

The conveying mechanism 11 consists of a long conveyer 36 adjacent the pick-up unit and a short conveyer 37 adjacent the baler unit. The long conveyer 36 includes a floor 38 and spaced slats 39 secured at their ends to chains 40. The short conveyer 37 has a floor 42 and spaced slats 43 secured to chains 44.

As seen in Figure 2, drive for the conveyers originates with a belt 46 driven by a suitable source of power, not shown. This belt 46 passes over a pulley 47 mounted upon a shaft 48. A housing 49 is secured adjacent the end of the shaft 48, and at the end of the shaft a bevel gear 50 is fixed. This gear is in mesh with another bevel gear 52 secured to a shaft 53 journaled at one end in the housing 49. The other end of the shaft rests within a sleeve 54. The bevel gear 52 has a clutching section 56, which is adapted to engage a clutch member 57 slidably keyed upon the sleeve 54. The clutch member 57 is engaged by a part 59 secured to the end of a shaft 60 slidably mounted in the housing 49. A link 61 is connected at one end to an end of the shaft 60, as at 62, and at the other end to one end of a lever 63, as at 64. The lever 63 is pivoted at its center on the framework supporting the conveying mechanism by means of a pivot member 65. The opposite end of the lever carries a follower 66, which is in engagement with a cam 67 mounted on a shaft 68. The cam 67 has a portion 69 of large radius and a reentrant portion 70 of smaller radius. The shaft 68 is vertical and has its upper end journaled in a member 72 and its lower end in a plate 73 connected to the framework supporting the conveyer mechanism. The member 72 is secured at the upper edge of a sheet 75, which extends along the conveyers 36 and 37 and in a direction generally vertical, but somewhat curved away from the conveyers at its upper edge. There are a plurality of slots 76 in this sheet 75, which allow the passage therethrough of retaining fingers 77 secured to the shaft 68. The uppermost retaining member 77 has an extension 78 with a handle 79 thereon. The fingers 77 are staggered so that the ends thereof will be in slots 76 in the curved portion of the sheet 75, as seen in Figure 1.

As previously stated, the clutch member 57 is slidably keyed upon the sleeve 54. This sleeve 54 is fixed to one end of a shaft 81, which shaft is supported at its other end in a bearing member 82. Also mounted at this end is a sprocket wheel 83, over which is passed a chain 84. This chain is also in mesh with a sprocket wheel 85 mounted upon a shaft 86. There are also sprocket wheels 87 and 88 on the shaft which are in mesh with the chains 40 previously referred to as supporting the slats 39 of the long conveyor 36.

At an end of the shaft 53, which protrudes from the housing 49, a sprocket wheel 90 is secured. A chain 91 meshes with this wheel and also with a sprocket wheel 92 secured to one end of a shaft 93. Also mounted on this shaft are sprocket wheels 94 and 95, with which mesh chains 44 previously referred to as supporting slats 43 of the short conveyer 47.

From the foregoing description it will be apparent that drive of the long conveyer 36 is dependent upon the clutch member's 57 being in engagement with the clutching section 56 of the bevel gear 52, for the long conveyer is connected with the clutch member 57 through the sleeve 54, shaft 81, sprocket wheel 83, chain 84, sprocket wheel 85, shaft 86, and sprocket wheels 87 and 88. Drive of the short conveyer 37 depends upon the sprocket wheel 90, which wheel is connected with the conveyer through chain 91, sprocket wheel 92, shaft 93 and sprocket wheels 94 and 95. The bevel gear 52 is continuously in mesh with the bevel gear 50 driven by the shaft 48, in turn driven by the pulley 47 and belt 46. The wheel 90 rotates with the bevel gear 52. Consequently, as long as the belt 46 supplies power to the pulley 47, the short conveyer will be driven. Driving of the long conveyer, however, can be interrupted by actuation of the member 78 and crank 79. Figure 1 shows the member and crank in such a position that the long conveyer is driven. When, however, it is desired to interrupt the drive of this conveyer, the member and handle are moved clockwise, as viewed in Figure 1 to a position like that shown in Figure 2. By this movement the shaft 68 and the cam 67 are caused to rotate. The follower member 66 moves from the portion 70 of small radius of the cam 67 to the portion 69 of large radius, and consequently an angular movement of the lever 63 is effected. This produces an axial sliding of the shaft 68 through the medium of the link 61 so as to cause the element 59 to slide the clutch member 57 axially of the sleeve 54 out of engagement with the clutch section 56 of the bevel gear 52.

In this position the gear 52 no longer drives the clutch member 57, and driving of the long conveyer stops. It is also to be noted that simultaneously with all of this, the fingers 77 are caused to move through the slots 76 in the plate or sheet 75 to a position substantially between the conveyers 36 and 37.

During normal operation, the pick-up baler is either moved over the ground or kept stationary. The tines 18 pick up hay and deposit it upon the floor 15, over which the slats 21 move it. When the hay reaches the top of the pick-up, it is deposited upon the roller 23 and from there moves onto the long conveyer 36. From the long conveyer 36 it moves to the short conveyer 37 and then into the baler unit 12. The operation upon the hay in the baler unit is well understood in the art and no description of it is given since it forms no part of the present invention. Suffice it to say that it is subjected to the alternate action of a feeder and a plunger, the feeder forcing the hay down into the baling chamber and the plunger compressing it. At regular intervals, a block must be placed in the hay, so that the compressed hay may be separated into bales. For the satisfactory placing of the block, the flow of hay must be stopped and divided. At this point, an operator will swing the member 78 in the clockwise direction, as viewed in Figure 1, previously referred to.

The action has the two-fold effect of stopping the running of the long conveyer and moving the retaining member 77 into a position between the conveyers. The short conveyer 37 continues to run, and the result is that hay cannot be fed from the long conveyer to the short conveyer because of the presence of the retaining element 77 and the stopping of the long conveyer. The short conveyer moves all of the hay left upon it into the baling unit and is left clear. The sweeping action of the retaining member 77 across the short conveyer and in a direction toward the long conveyer aids the clearing of the short conveyer. The result is a stopping of the flow of the hay and a clear separation between the hay in the baler unit and that left in the conveyer mechanism. The block may now be satisfactorily positioned against the compressed hay in the baler unit. After it has been positioned, the member 78 is again swung back to its original position in Figure 1, the retaining member 77 being moved out of the way and the long conveyer 36 being again driven. Hay now again flows into the baler unit for compressing and baling.

It will be apparent from the foregoing description that a novel conveying mechanism has been provided suitable for use in conveying hay between a pick-up unit and a baler unit. It is to be understood that the conveying mechanism is not to be limited in its use with the particular pick-up unit shown, but may find use in the transporting of crops to be treated between any sort of a pick-up unit and any sort of a crop-treating unit, or for the mere feeding of crops into a treating unit.

The invention is to be limited only in terms of the appended claims.

What is claimed is:

1. Mechanism for feeding material to a baling unit, comprising a first conveyer adapted to receive material, a second conveyer adapted to transfer material from the first conveyer to the baling unit, a movably positioned material retaining device, and means constructed and arranged for stopping the first conveyer and for moving the retaining device in a substantially horizontal direction from a non-retaining position in relation to the material handled into a material retaining position between the conveyers.

2. Mechanism for feeding material to a treating device, comprising a first conveyer adapted to receive material, a second conveyer adapted to transfer material from the first conveyer to the treating device, a movably positioned material retaining device, means constructed and arranged for moving the retaining device in a substantially horizontal direction from a non-retaining position in relation to the material handled into a material retaining position between the conveyers, and means for stopping the first conveyer.

3. Mechanism for feeding material to a treating device, comprising a first conveyer adapted to receive material, a second conveyer adapted to transfer material from the first conveyer to the treating device, an oscillatably positioned material retaining device, means for horizontally oscillatably moving the retaining device from a non-retaining position in relation to the material handled into a material retaining position between the conveyers, and means for curtailing the movement of the first conveyer in the direction toward the treating device materially below the rate of movement of the second conveyer in the same direction.

4. Mechanism for feeding material to a baling unit, comprising a first conveyer adapted to receive material, a second conveyer adapted to transfer material from the first conveyer to the baling unit, a retaining device, means constructed and arranged for moving the retaining device across the second conveyer in a direction generally away from the baling unit to a position between the conveyers, and means for stopping the first conveyer.

5. Mechanism for feeding material to a baling unit, comprising a first conveyer adapted to receive material, a second conveyer adapted to transfer material from the first conveyer to the baling unit, a retaining device, means constructed and arranged for moving the retaining device across the second conveyer in a direction generally away from the baling unit to a position between the conveyers, and means for curtailing the movement of the first conveyer in the direction toward the baling unit materially below the rate of movement of the second conveyer in the same direction.

6. Mechanism for feeding material to a baling unit, comprising a support, a first conveyer mounted on the support and adapted to move material toward the baling unit, a second conveyer mounted on the support and adapted to move material from the first conveyer to the baling unit, a retaining device pivotally mounted on the support on an axis alongside the conveyers and substantially at right angles to the plane of the conveyers, means for swinging the retaining device about its pivot axis from a position alongside the conveyers over the second conveyer in a direction generally away from the baling unit to a position between the conveyers, and means for stopping the first conveyer.

7. Mechanism for feeding material to a baling unit, comprising a support, a first conveyer mounted on the support and adapted to move material toward the baling unit, a second conveyer mounted on the support and adapted to move material from the first conveyer to the baling unit, a retaining device pivotally mounted on the support on an axis alongside the conveyers and substantially at right angles to the conveyers, means constructed and arranged for swinging the retaining device about its pivot axis from a position alongside the conveyers over the second conveyer in a direction generally away from the baling unit to a position between the conveyers, and means for curtailing the movement of the first conveyer in the direction of the baling unit materially below the rate of movement of the second conveyer in the same direction.

8. Mechanism for feeding material to a baling unit, comprising a first driven conveyer adapted to receive material, a second driven conveyer adapted to transfer material from the first conveyer to the baling unit, raking means constructed and arranged and having only oscillatable movement and being capable of movement from a non-obstructing position in relation to the material moved on the conveyers to a stationary position obstructing transfer of material from the first to the second conveyer.

9. Mechanism for feeding material to a baling unit, comprising a first driven conveyer adapted to receive material, a second driven conveyer adapted to transfer material from the first conveyer to the baling unit, raking means constructed and arranged and having only oscillatable movement and being positioned to move from a normally ineffective position to a stationary position generally between the conveyers to prevent transfer of material from the first to the second conveyer, and means for stopping the first conveyer.

10. Mechanism for feeding material to a baling unit, comprising a first conveyer adapted to receive material, a second conveyer adapted to transfer material from the first conveyer to the baling unit, a forked raking retainer constructed and arranged and having only oscillatable movement and being positioned adjacent the proximate inner ends of the conveyers for movement between obstructing and non-obstructing positions with respect to the material moved on the conveyers.

11. Mechanism for feeding material to a baling unit, comprising a first driven conveyer adapted to receive material, a second driven conveyer adapted to transfer material from the first conveyer to the baling unit, an oscillatable retainer constructed and arranged and positioned for substantially horizontal movement from a non-obstructing position in relation to the material moved on the conveyers to a stationary position obstructing movement of the material from the first to the second conveyer, and means to stop movement of the first conveyer.

CLEMMA R. RANEY.